United States Patent [19]

Nishikawa

[11] Patent Number: 5,258,842
[45] Date of Patent: Nov. 2, 1993

[54] DC RESTORER WITH REDUCED LOW FREQUENCY NOISE

[75] Inventor: Katuhiko Nishikawa, Aichi, Japan
[73] Assignee: Sony Corporation, Tokyo, Japan
[21] Appl. No.: 832,882
[22] Filed: Feb. 10, 1992

[30] Foreign Application Priority Data

Feb. 14, 1991 [JP] Japan .................... 3-021062

[51] Int. Cl.[5] .............................. H04N 5/18
[52] U.S. Cl. ..................... 358/171; 358/177
[58] Field of Search ........... 358/171, 172, 174, 157, 358/177

[56] References Cited

U.S. PATENT DOCUMENTS 3,947,631 3/1976 Rhee et al. ............... 358/171 X
4,998,170 3/1991 Nohara .................. 358/172 X

FOREIGN PATENT DOCUMENTS 235587 9/1987 European Pat. Off. .
281175 9/1988 European Pat. Off. .
1-274570 11/1989 Japan .

*Primary Examiner*—Mark R. Powell
*Attorney, Agent, or Firm*—Lewis H. Eslinger; Jay H. Maioli

[57] ABSTRACT

A video signal processing circuit includes a separating circuit for separating a sync. signal of a video signal, a sample-and-hold circuit for subjecting a d.c. reference portion of the video signal to a sample-and-hold operation in response to the separated sync. signal, and a superimposing circuit for reversing the polarity of the d.c. reference voltage subjected to the sample-and-hold operation and superimposing it on the video signal to eliminate an unnecessary fluctuation component of the video signal. The separation of the sync. signal by the sync. separating circuit is performed on the basis of the video signal from which the unnecessary fluctuation component is eliminated by the superimposing circuit.

3 Claims, 2 Drawing Sheets

DC RESTORER WITH REDUCED LOW FREQUENCY NOISE

BACKGROUND OF THE INVENTION

1. Field of the Invention

The present invention generally relates to video signal processing circuits and, more particularly, is directed to a video signal processing circuit for use in a television receiver or the like.

2. Description of the Related Art

In the conventional television receiver, for example, the removal of an unnecessary lower-frequency component such as hum or sag or the like is performed by pulling-in or drawing a portion of a video signal serving as a d.c. reference to a desired d.c. voltage. This method, however, leaves a trace due to the pull-in or drawing operation in the video signal, thereby causing a distortion in the television signal to damage the original video signal considerably.

OBJECTS AND SUMMARY OF THE INVENTION

Therefore, it is an object of the present invention to provide an improved video signal processing circuit in which the aforementioned shortcomings and disadvantages encountered with the prior art can be eliminated.

More specifically, it is an object of the present invention to provide a video signal processing circuit which can remove an unnecessary lower-frequency component such as hum or sag or the like without affecting the video signal at all.

As an aspect of the present invention, a video signal processing circuit is comprised of a separating circuit for separating a sync. signal of a video signal, a sample-and-hold circuit for subjecting a d.c. reference portion of the video signal to a sample-and-hold operation in response to the separated sync. signal, and a superimposing circuit for reversing the polarity of the d.c. reference voltage subjected to the sample-and-hold operation and superimposing it on the video signal to eliminate an unnecessary fluctuation component of the video signal, wherein the separation of the sync. signal by the separating circuit is performed on the basis of the video signal from which the unnecessary fluctuation component is eliminated by the superimposing circuit.

The preceding and other objects, features, and advantages of the present invention will become apparent from the following detailed description of an illustrative embodiment thereof when read in conjunction with the accompanying drawings, in which like reference numerals are used to identify the same parts in the several views.

DESCRIPTION OF THE PREFERRED EMBODIMENT

A video signal processing circuit according to an embodiment of the present invention will now be described with reference to FIGS. 1 and 2, in which case, the present invention is applied to the television receiver or the like.

Figure 1:
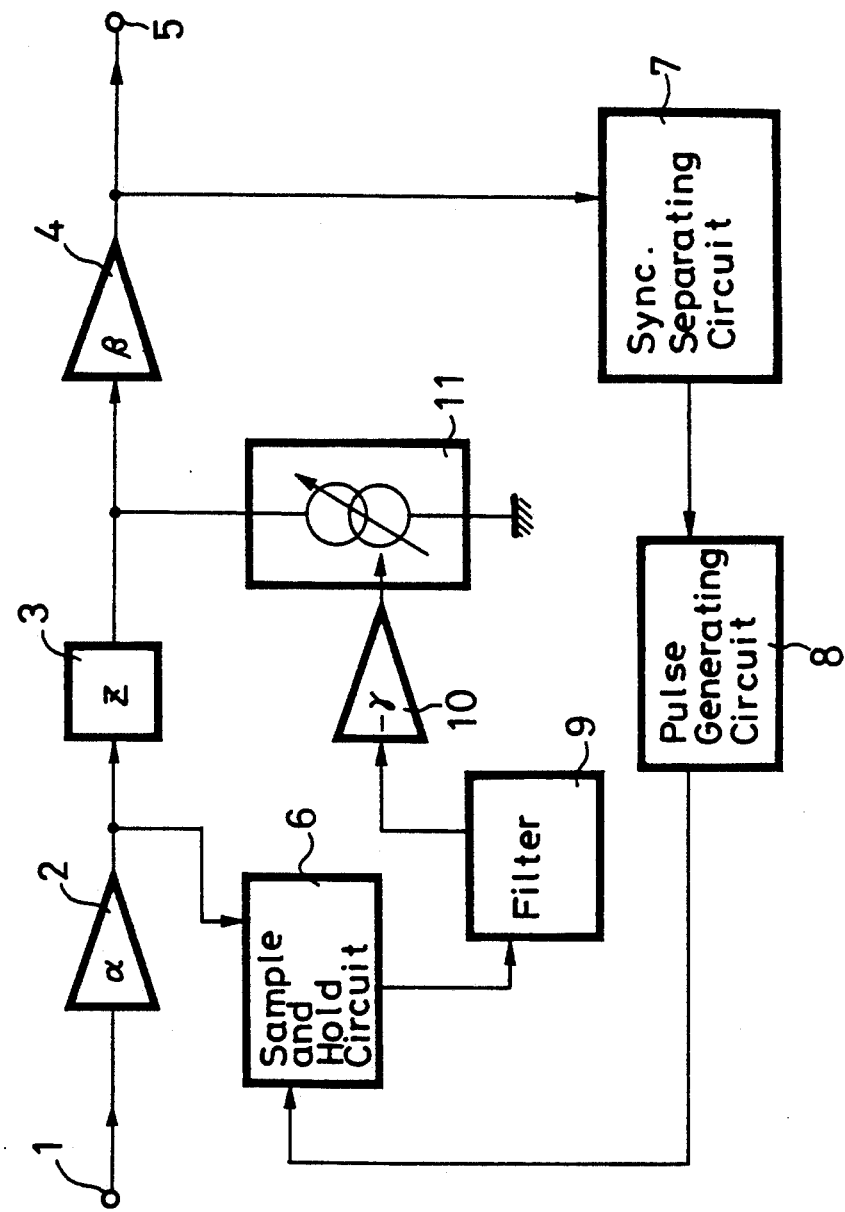
FIG. 1 shows in block form an arrangement of a video signal processing circuit according to an embodiment of the present invention.

FIG. 1 shows an arrangement of the embodiment of the present invention. Referring to FIG. 1, a video signal including a sync. (synchronizing) signal is applied to an input terminal 1. The video signal applied to the input terminal 1 is then taken out from an output terminal 5 through a buffer amplifier 2 having a gain $\alpha$ ($\alpha$ is a positive value), an impedance circuit 3 having an adequate impedance z, and a buffer amplifier 4 having a gain $\beta$ ($\beta$ is a positive value). An output signal of the buffer amplifier 2 is also applied to a sample-and-hold circuit 6.

An output signal of the buffer amplifier 4 is applied to a sync. signal separating circuit 7, which in turn separates the sync. signal and applies it to a pulse generating circuit 8. The pulse generating circuit 8 generates a sampling pulse corresponding to a predetermined d.c. reference portion of the video signal on the basis of the sync. signal supplied thereto and applies the sampling pulse to the sample-and-hold circuit 6. Then, the sample-and-hold circuit 6 picks up a d.c. reference voltage from the video signal supplied from the buffer amplifier 2 in response to the sampling pulse.

The thus picked-up d.c. reference voltage of the video signal is subjected to a filtering operation by a filter 9 and then applied to a buffer amplifier 10 having an inversion gain $-\gamma$ ($\gamma$ is a positive value). A voltage-controlled variable current source 11 is controlled in its output current by an output signal of the buffer amplifier 10. Thus, by connecting the output of the variable current source 11 to a junction between the impedance circuit 3 and the buffer amplifier 4, a d.c. voltage at this junction is shifted in accordance with the output current of the variable current source 11, so that an unnecessary fluctuation component (unnecessary lower-frequency component) of the video signal is cancelled by the shift of the d.c. voltage.

Further, the video signal processing circuit of the embodiment can also treat an unnecessary fluctuation component fluctuating at a relatively high speed and has a degree of freedom in the selection of a responsive speed. Furthermore, since the sync. separation is performed on the basis of the video signal which has been subjected to the cancelling operation of the unnecessary fluctuation component, both the sync. separation operation and the cancelling operation of the unnecessary fluctuation component can be performed stably.

Figure 2:
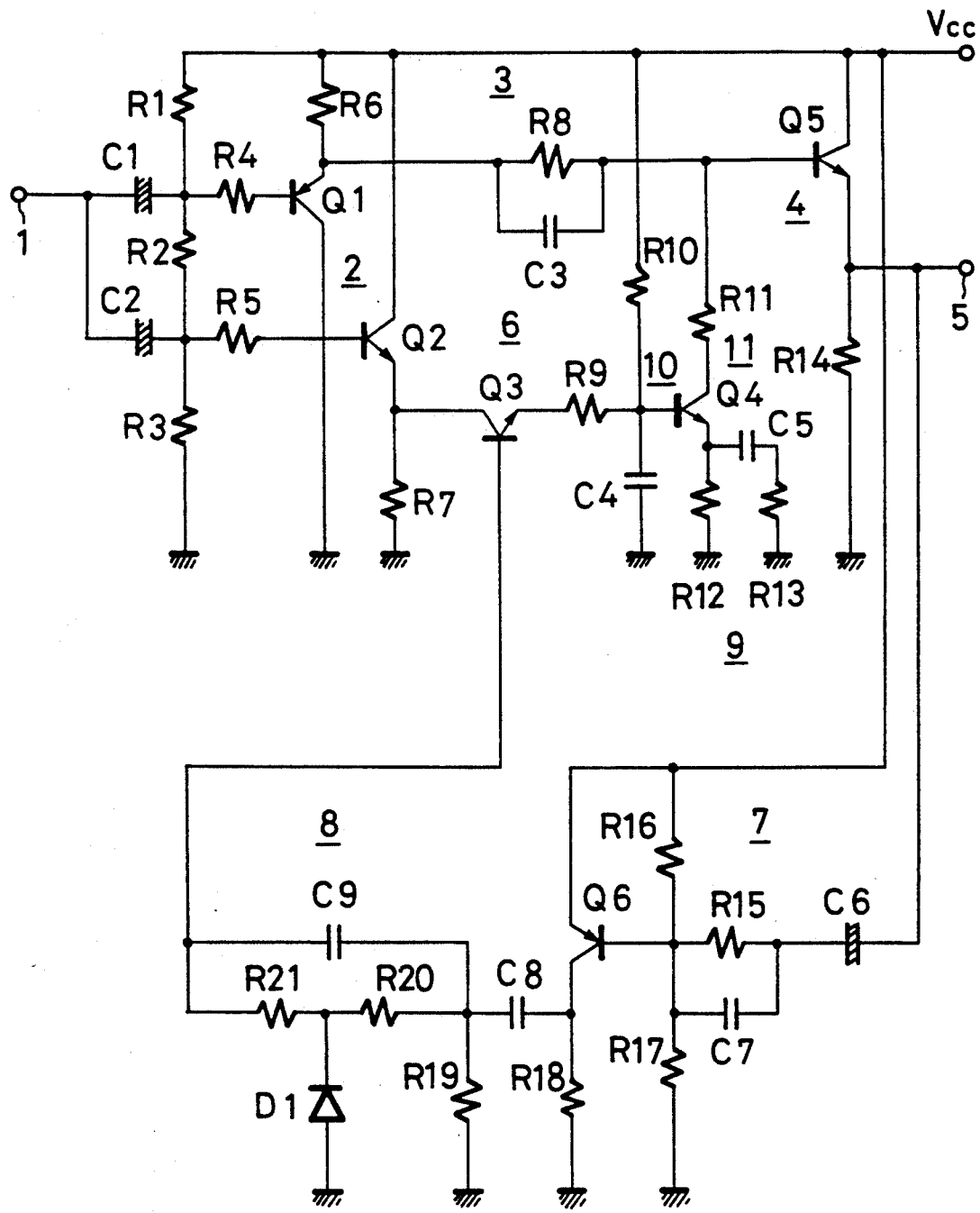
FIG. 2 shows a circuit diagram illustrating an example of the video processing circuit of FIG. 1.

FIG. 2 shows an example of a most simplified circuit arrangement for realizing the constructions of FIG. 1. Referring to FIG. 2, transistors Q1 and Q2 constitute the buffer amplifier 2, a resistor R8 and a capacitor C3 constitute the impedance circuit 3, a resistor R9, a transistor Q3 and capacitors C4, C5, R13 constitute a sample-and-hold circuit 6 and the filter 9, a transistor Q6, resistors R16, R17, R15 and a capacitor C7 constitute the sync. separation circuit 7, capacitors C8, C9, resistors R19, R20, R21 and a diode D1 constitute a pulse generating circuit 8, and a transistor Q4, resistors R12, R13 and the capacitor C5 constitute the variable current source 11. Thus, the construction of the arrangement shown in FIG. 1 are realized. Now, the constructions of FIG. 1 may be configured by other types of circuit arrangements other than that of FIG. 2.

As set out above, according to this invention, since the d.c. reference voltage obtained by the sample-and-hold operation of the video signal is reversed in its polarity and then superimposed on the video signal, the unnecessary d.c. fluctuation component can be eliminated, whereby the unnecessary lower-frequency component such as hum or sag or the like can can be eliminated without influencing or degrading the video signal at all.

Having described the preferred embodiment of the invention with reference to the accompanying drawings, it is to be understood that the invention is not limited to those precise embodiment and that various changes and modifications thereof could be effected by one skilled in the art without departing from the spirit or scope of the novel concepts of the invention as defined in the appended claims.

What is claimed is:

1. A video signal processing circuit comprising:
   means separating a sync. signal of a video signal;
   sample-and-hold means for subjecting a d.c. reference portion of the video signal to a sample-and-hold operation in response to the separated sync. signal; and
   superimposing means including a buffer amplifier with an inversion gain for amplifying the sampled d.c. reference voltage supplied from said sample-and-hold means, means for controlling an output current thereof in accordance with an output voltage from said buffer amplifier and means for applying the output current to the video signal for reversing the polarity of the d.c. reference voltage subjected to the sample-and-hold operation and superimposing it on the video signal to eliminate an unnecessary fluctuation component of the video signal, wherein the separation of the sync. signal by said means for separating is performed on the basis of the video signal from which the unnecessary fluctuation component is eliminated by said superimposing means.

2. A video signal processing circuit according to claim 1, wherein said superimposing means is formed of a buffer amplifier having an inversion gain and a variable current source.

3. A video signal processing circuit according to claim 2, wherein said variable current source includes a transistor, a resistor and a capacitor.

* * * * *